US008666068B2

(12) United States Patent
Sharon et al.

(10) Patent No.: US 8,666,068 B2
(45) Date of Patent: Mar. 4, 2014

(54) METHOD FOR SCRAMBLING SHAPED DATA

(75) Inventors: Eran Sharon, Rishon Lezion (IL); Idan Alrod, Herzliya (IL); Ariel Navon, Revava (IL)

(73) Assignee: Sandisk Technologies Inc., Plano, TX (US)

( * ) Notice: Subject to any disclaimer, the term of this patent is extended or adjusted under 35 U.S.C. 154(b) by 147 days.

(21) Appl. No.: 13/331,705

(22) Filed: Dec. 20, 2011

(65) Prior Publication Data
US 2013/0101111 A1  Apr. 25, 2013

Related U.S. Application Data

(60) Provisional application No. 61/549,448, filed on Oct. 20, 2011.

(51) Int. Cl.
*G06F 21/00* (2013.01)
(52) U.S. Cl.
USPC .............. 380/28; 380/29; 380/37; 380/42
(58) Field of Classification Search
USPC .......................... 380/28, 29, 37, 42
See application file for complete search history.

(56) References Cited

U.S. PATENT DOCUMENTS

| | | | |
|---|---|---|---|
| 4,100,374 A * | 7/1978 | Jayant et al. | ............. 380/28 |
| 7,388,781 B2 | 6/2008 | Litsyn et al. | |
| 7,493,457 B2 | 2/2009 | Murin | |
| 7,693,667 B2 | 4/2010 | Foo | |
| 7,697,325 B2 | 4/2010 | Sprouse et al. | |
| 2003/0235325 A1 | 12/2003 | Ray et al. | |
| 2006/0164883 A1 | 7/2006 | Lablans | |
| 2008/0031042 A1 | 2/2008 | Sharon | |
| 2008/0151618 A1 | 6/2008 | Sharon et al. | |
| 2008/0158948 A1 | 7/2008 | Sharon et al. | |
| 2009/0204824 A1 | 8/2009 | Lin et al. | |
| 2010/0054471 A1 | 3/2010 | Rawson, Sr. | |
| 2010/0180179 A1 | 7/2010 | Lastras-Montano | |
| 2010/0281340 A1 | 11/2010 | Franceschini et al. | |
| 2011/0029754 A1 | 2/2011 | Litsyn et al. | |
| 2011/0080669 A1 * | 4/2011 | Parthasarathy et al. | ......... 360/49 |
| 2011/0093652 A1 | 4/2011 | Sharon et al. | |
| 2011/0276749 A1 | 11/2011 | Litsyn et al. | |

FOREIGN PATENT DOCUMENTS

| WO | 9624098 A2 | 8/1996 |
|---|---|---|
| WO | 2010092536 A1 | 8/2010 |

OTHER PUBLICATIONS

The International Search Report and Written Opinion of the International Searching Authority mailed Dec. 14, 2012 in International Application No. PCT/US2012/060382, 11 pages.

* cited by examiner

*Primary Examiner* — Brandon Hoffman
*Assistant Examiner* — Hee Song
(74) *Attorney, Agent, or Firm* — Toler Law Group, PC

(57) ABSTRACT

A method includes, in a data storage device, receiving data having a particular proportion of zero values and one values and scrambling the data to generate scrambled data that has the particular proportion of zero values and one values.

40 Claims, 5 Drawing Sheets

METHOD FOR SCRAMBLING SHAPED DATA

CROSS-REFERENCE TO RELATED APPLICATIONS

The present application claims priority to U.S. Provisional Application No. 61/549,448, filed Oct. 20, 2011, which application is hereby incorporated by reference in its entirety.

FIELD OF THE DISCLOSURE

The present disclosure is generally related to scrambling data.

BACKGROUND

Data may be modified prior to storage in a memory. For example, data can be "shaped" to change a proportion of one values ("1's") and zero values ("0's") in the data. Storing shaped data may wear a memory less than storing random data having an equal number of 1's and 0's. As another example, data can be "scrambled" to cause the data to appear more random using a bit-wise exclusive-or (XOR) operation applied to the data and to a random or pseudo-random sequence of bits. Scrambling data may remove repeating patterns of bits in the data (e.g. a long sequence of 0's or 1's) that may cause program disturb effects when written in a memory. However, if shaped data is scrambled by XORing the shaped data with a random or pseudo-random sequence of bits, the scrambled data may not retain the "shaped" proportion of 1's and 0's and may instead exhibits a substantially random distribution where 1's and 0's occur with substantially equal probability.

SUMMARY

Permutation scrambling generates scrambled data that preserves a proportion of 1's and 0's of input data. A permutation scrambling operation may be used to scramble shaped data to generate shaped scrambled data that can be stored to a memory. The shaped scrambled data can be read from the memory and another permutation scrambling operation can be applied to recover the shaped data.

DETAILED DESCRIPTION

User data may be transformed into a "shaped" data sequence having data statistics that are different from the original user data. For example, a user data sequence may be transformed into a "shaped" data sequence in which a number of 0's is reduced. A motivation for shaping data is to reduce an occurrence of disturbance effects in a flash memory and to reduce wearing of cells in the flash memory.

Data may also be scrambled prior to programming the data into a flash memory. Such scrambling may be used in order to cause the data programmed to the flash memory to appear random and not repetitive. Repetitive patterns programmed to the memory may result in various program disturb affects due to boosting issues and back patterns. For example, data can be scrambled by XORing the data with a pseudo random bit sequence (that may be generated using a linear feedback shift register (LFSR)).

However, XOR-based scrambling changes the shaping generated by a shaping transformation. When a "shaped" sequence of bits having a small fraction of 0's is XORed with a random independent and identically distributed (i.i.d.) sequence of bits having ~50% 0's, then the resulting scrambled sequence will also have ~50% 0's and the "shaping" will be lost. Actually, any input sequence of 0-s and 1-s, when XOR-ed with a (pseudo) random i.i.d. sequence of bits having ~50% 0's and ~50% 1's and having no correlation with the input sequence, will result in a random i.i.d. sequence having ~50% 0's and ~50% 1's. Since there is no correlation between the two sequences, the 0's and 1's of the i.i.d. sequence will be distributed at a proportion of ~50% 0's and ~50% 1's across the 0's of the input sequence. Therefore, ~50% of the 0's of the input sequence will switch signs and become 1's when the input sequence is XORed with the i.i.d. sequence. Similarly, ~50% of the 1's of the input sequence will switch to 0, resulting in a distribution of ~50% 0's in the resulting sequence.

Data scramblers are disclosed that preserve the shaping distribution of a sequence of bits. For example, a scrambler may permute bit locations according to some pseudo random permutation and without XOR-ing the data with a pseudo-random or random scrambling word.

A method to implement a permutation scrambler on a string (e.g. a sequence of symbols (e.g. data bits)) of length Q, may include:

a. choosing a random or pseudo-random integer P that is prime to Q; and b. Reordering the string such that the first bit will be bit number 0, the second bit will be bit number P (modulo (mod) Q), the third bit will be 2P (mod Q), and in general the k-th bit will be bit number (k−1)P (mod Q). Alternatively, the string may be reordered by choosing sequential bits to form a scrambled output by choosing an initial bit from the string (either bit number 0, or any other randomly or non-randomly chosen bit) and then choosing the following bits by incrementing the address (cyclically) by P each time.

Figure 1:
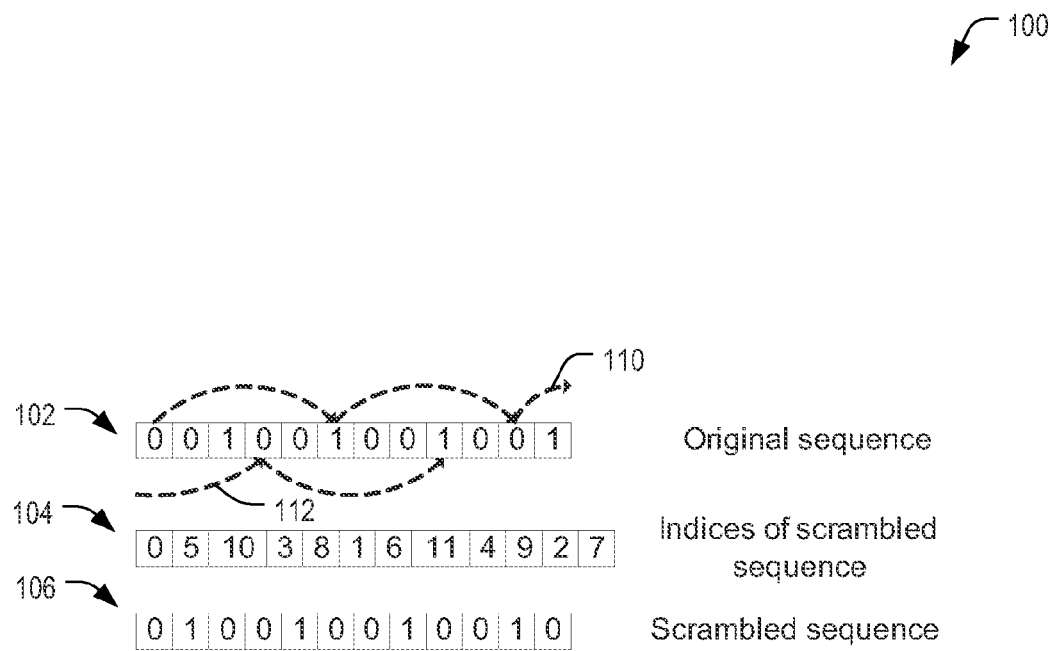
FIG. 1 is a general diagram illustrating a particular embodiment of permutation scrambling.

FIG. 1 illustrates an embodiment 100 of permutation scrambling of a string 102 having length Q equal to 12 and P=5. A scrambled sequence 106 and indices 104 of the scrambled sequence are illustrated. The scrambled sequence 106 begins with the first bit (i.e. the first bit of the scrambled sequence 106 is the same as the first bit of the original sequence 102). The next bit is chosen by incrementing the bit address by P=5 (see the upper arc 110), and again the next bit is chosen by incrementing again by 5. For the third bit it is not possible to increment by 5 since there is only 1 bit to the end of the string 102, so the increment by 5 is done cyclically, meaning incrementing by 1 to the end of the string 102 and the remaining 4 are incremented from the beginning of the string 112 (see the lower arc 112). This process may be repeated until every bit of the string 102 has been selected and copied to the scrambled sequence 106. The choice of P to be prime to Q ensures that all bits of the string will be selected.

Permutation scrambling as illustrated in FIG. 1 may be implemented in a data storage device, such as a solid state drive (SSD), a flash memory card, or an embedded flash memory, as illustrative, non-limiting examples. For example, a data storage device may include a counter that resets upon a counter value reaching a value of Q. The counter value may be read after every P increments of the counter (e.g. to generate the indices 104). The counter value may be used as a bit address or as a bit address offset (e.g. a location in the original sequence 102) to locate a next sequential bit of scrambled data (e.g. the scrambled sequence 106) generated in the data storage device. As another example, a data storage device may include a controller that is programmed to increment a count value by P (mod Q), to locate a bit in the original sequence 102 according to the count value, and to copy the located bit as a next sequential bit in the scrambled sequence 106.

It is also possible to use several different pseudo random integers P that are relative prime to Q. For each permuted block, a different relative prime integer P may be chosen to generate a different permutation. The relative prime integer P may be chosen randomly for every block. For example, if n relative prime integers are used, a permutation seed may include log 2(n)+log 2(Q) bits, where log 2(n) bits (e.g. the first log 2(n) bits in the permutation seed) indicate the relative prime integer P to be used and where log 2(Q) bits (e.g. the last log 2(Q) bits in the permutation seed) indicate the starting point from which the permutation is performed (i.e. the bit position from which to start incrementing by P (mod Q)).

In another embodiment, permutation scrambling that generates scrambled data that has a same proportion of 0's and 1's as input data can be performed using a LFSR. For example, permutation scrambling may be performed using an LFSR of size log 2(Q) bits (when Q is a power of 2), corresponding to some primitive polynomial of a Galois Field GF(Q). If initialized with a seed sequence which is not all zeros, the LFSR would output all the numbers from 1 to Q−1 in random or pseudo-random order. The numbers output by the LFSR may be used as indices of a scrambled sequence. For example, indices, such as the indices 104 of FIG. 1, may be generated by an LFSR to generate a sequence of values that is different from the P (mod Q) sequence of FIG. 1.

Alternatively, several LFSRs may be used that are based on different primitive polynomials of GF(Q). For each permuted block, a different LFSR may be chosen for the permutation to generate a different permutation for different blocks. The LFSR may be chosen randomly from block to block. For example, if n different LFSRs are used, a permutation seed may include log 2(n)+log 2(Q) bits, where log 2(n) bits indicate the LFSR to be used for generating the permutation and log 2(Q) bits are used to initialize the LFSR.

Figure 2:
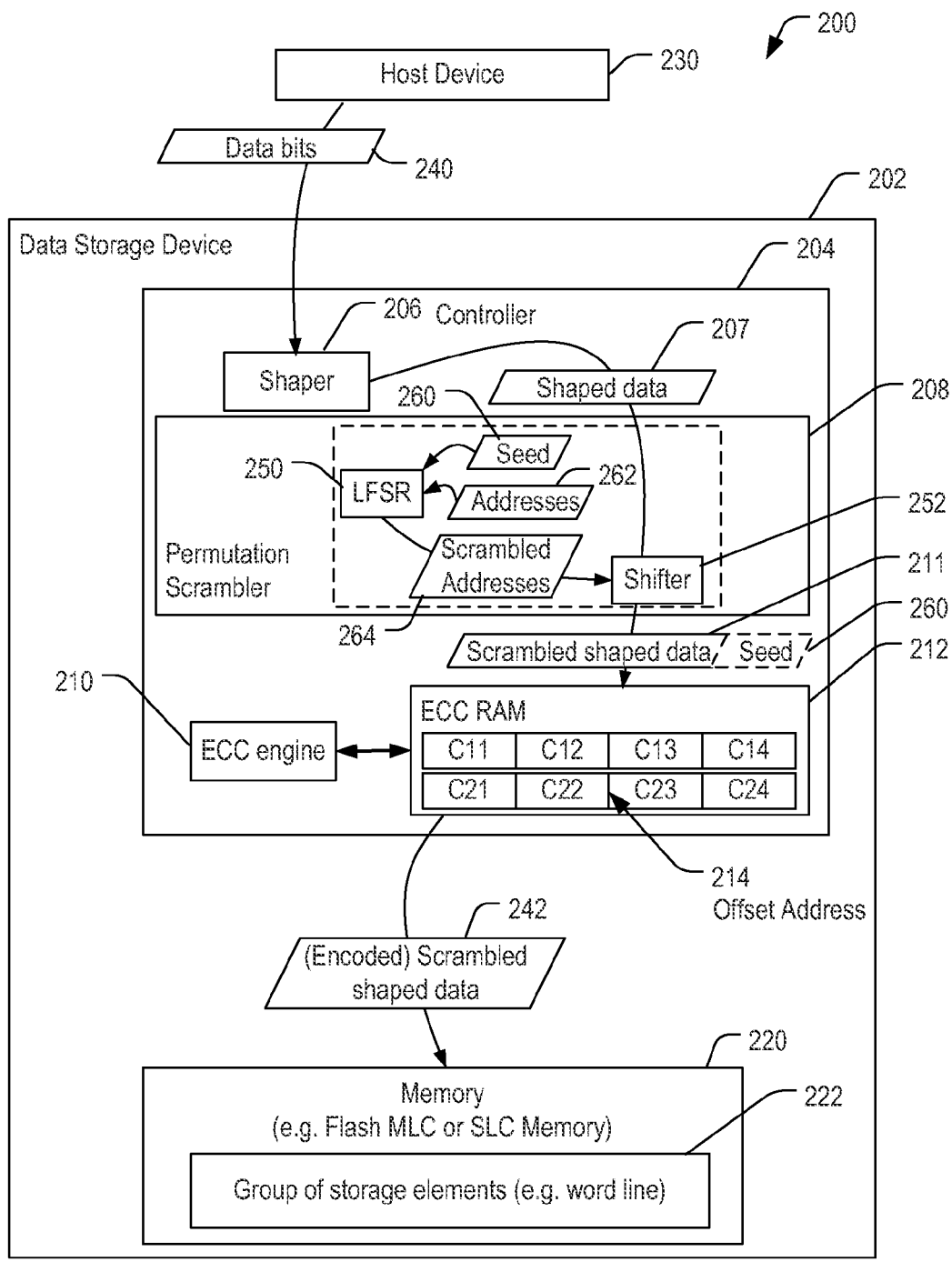
FIG. 2 is a block diagram illustrating a particular embodiment of a data storage device including a permutation scrambler.

In other embodiments, such as described with respect to FIG. 2, permutation scrambling may not be performed on single bits and may instead be performed on larger chunks of data, e.g. a nibble, byte, a word, a double word, as illustrative, non-limiting examples. One or more procedures described above may be applied to larger chunks by applying the same reordering (e.g. the reordering illustrated in FIG. 1) on positions of chunks instead of positions of bits. Further permutation may be performed internally within each chunk (e.g. further permuting of the bits within each byte may be performed), by applying the same procedures or according to one or more other procedures to permute bits within a chunk.

Different permutations may be performed during each activation of a scrambling procedure (i.e. each time a string is scrambled). Performing different permutations may be accomplished by choosing a different integer P in each activation. The chosen integer P serves as a "seed" for the permutation scrambling. P may be chosen as a function of a physical location (e.g. word line (WL) number) and/or as a function of a number of write/erase cycles and/or as a function of any other parameter. Alternatively, P may be chosen randomly. If the seed is random or a function of a parameter that is not known during reading, then the seed may be stored along with the data in order to enable descrambling during reading of the data.

A method of programming data received from a host to be stored in a flash memory can include:
1) Receive data from the host
2) Perform a shaping transformation to generate a transformed bit sequence
3) Perform permutation scrambling on the transformed bit sequence
4) If the seed used for permutation scrambling is randomly or pseudo-randomly chosen, concatenate the seed used for the permutation scrambling to the permuted bit sequence
5) Encode the permuted bit sequence (and, in some embodiments, the seed) using an Error Correction Code (ECC) encoder to generate an encoded sequence
6) Program the encoded sequence to the flash memory During reading, encoded data from the flash memory may be read by a sequence of operations including:
1) Read the encoded data from the flash memory
2) Decode the encoded data using an ECC decoder
3) Use the decoded seed (or a known seed) to descramble the decoded data (i.e. perform an inverse permutation of the permutation used to scramble the data)
4) Perform a reverse shaping transformation on the descrambled data to recover data
5) Send the data to a host device (if the data is requested by the host)

As the permutation scrambling is performed prior to ECC encoding, the permutation scrambling can be performed "on-the-fly" as part of the filling of a random access memory (RAM) of the ECC encoder. This may be done by filling the bits into the ECC encoder RAM in a pseudo-random order as a function of the seed. For example, a permutation scrambling may be performed on chunk addresses (e.g. addresses of chunks such as bytes, words, double-words) and permutation scrambling can be performed on the bits within each of the chunks. Scrambling of both the address and the bits stored to the address can be performed using one or more of the methods described above. For the bits within a chunk stored to an address, permutation scrambling may be performed using pseudo-random cyclic shifts that may be performed using low-complexity hardware. Scrambling within an m-bit chunk may be performed using an additional LFSR of length log 2(m) to output, for each address, a pseudo-random sequence of log 2(m) bits that indicate what cyclic permutation to perform on the m bits stored in the address. Several such length log 2(m) LFSRs may be used (e.g. k LFSRs). Note that an overall permutation scrambling seed may include log 2(n)+log 2(Q)+log 2(k)+log 2(m) bits, where log 2(n) bits indicate an address permutation LFSR, log 2(Q) bits are used to initialize the address permutation LFSR, log 2(k) bits indicate a cyclic shift LFSR, and log 2(m) bits are used to initialize the cyclic shift LFSR.

During reading of data, after decoding, information bits can be output from the ECC decoder RAM and provided to the host by applying the corresponding descrambling operation (i.e. by applying the reverse permutation, using the same seed).

In addition to permutation scrambling of data prior to ECC encoding, a location of parity bits within an ECC block may be changed, such as between successive encoding operations, or according to a schedule of parity shifts, or by any other mechanism. If parity bits are programmed to the same cells each time, the cells storing the parity bits may be worn faster than the cells storing the information bits because the parity bits are expected to have 50% zeros, while the information bits, which undergo the shaping transformation, are expected to have a lower percentage of zeros. Changing the location of the parity bits can be performed by cyclically shifting the ECC codeword (i.e. the information bits and the parity bits). Cyclically shifting the ECC codeword may be performed by outputting the codeword bits from the ECC encoder RAM to the flash memory starting from some offset address of the RAM and then incrementing the offset address, modulo the RAM depth (e.g. a size of the RAM and/or the number of addresses in the RAM). The offset address can be a function of a count of write/erase cycles of the block into which the data is to be programmed or a function of any other parameter that changes and that would be known when data is read from the block. For example, the offset address can be a function of a parameter that changes value with each program operation of the block. During reading, RAM used by an ECC decoder may be filled starting from the offset address. The offset address may then be incremented modulo the RAM size.

Alternatively, the offset address can be chosen randomly and stored at some other location of the memory. For example, the offset address may be stored in one or more flash management tables.

Alternatively, the offset address can be chosen randomly out of a predefined set of offset addresses. During reading, the offset address may be detected by identifying an area in the ECC block with a high concentration of 1's (e.g. approximately 50% of bits in the area are 1's). An area with a high concentration of 1's may be detected by counting the number of 1's within multiple windows (each window corresponding to a different offset address of the predefined set of offset addresses), where the window size may be equal to the number of parity bits. The offset address corresponding to a start of the parity may be determined by identifying the window corresponding to the highest count of 1's (as the parity will have approximately a 50% concentration of 1's, while non-parity data may be shaped to have a lower concentration of 1's). Note that misdetection of the offset address results in ECC decoding failure. If ECC decoding fails, additional ECC decoding attempts may be performed using the different parity offset addresses. Note that in case of misdetection, where the wrong parity address offset is used, full ECC decoding may be avoided and early detection of parity address offset misdetection may be performed, such as by detecting a high syndrome weight (e.g. where approximately 50% of the parity checks are not satisfied) that indicates that decoder is not operating on a legitimate codeword. Further, in applications where the amount of "shaping" of the data changes from block to block, if the fraction of 1's in the data sequence is close to 50% (i.e. the data is not strongly "shaped"), the encoder may use a predefined default offset of the parity address during programming because the decoder may not be able detect the parity offset during read based on comparing counts of 1's in each window. For example, during reading, if all counts corresponding to the possible parity offsets show roughly the same value of 50% 1's and no offset shows a distinctly higher count compared to other offsets (or the difference between the highest count and the second highest count is smaller than some threshold), the ECC decoder may assume that the predefined default offset was used for the parity.

Disclosed methods of permutation scrambling enable avoidance of repetitive patterns of stored data that may cause various disturb effects in a flash memory. Disclosed methods can be used in conjunction with "shaping" transformations (e.g. transformations that are performed as part of endurance enhancement coding).

Further, the disclosed methods enable substantially even distribution of wearing introduced to flash memory cells by changing a physical location of non-shaped bits (e.g. parity bits).

Referring to FIG. 2, a system 200 is depicted that includes a data storage device 202 coupled to a host device 230. The data storage device 202 includes a controller 204 coupled to a memory 220. The controller 204 includes a permutation scrambler 208. The permutation scrambler 208 is configured to perform a scrambling operation that preserves a proportion of 1's and 0's of the data to be scrambled.

The host device 230 may include a mobile telephone, a music or video player, a gaming console, an electronic book reader, a personal digital assistant (PDA), a computer such as a laptop computer, notebook computer, or tablet, any other electronic device, or any combination thereof. The data storage device 202 may be configured to be operatively coupled to the host device 230. To illustrate, the data storage device 202 may be a memory card, such as a Secure Digital SD® card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 202 may be configured to be coupled to the host device 230 as embedded memory, such as eMMC® (trademark of JEDEC Solid State Technology Association, Arlington, Va.) and eSD memory, as illustrative examples.

The data storage device 202 includes the controller 204 that includes a shaper 206, the permutation scrambler 208, an ECC engine 210, and a random access memory (RAM) accessible to the ECC engine 210 (ECC RAM) 212. The controller 204 is configured to receive data bits 240 at the shaper 206. The shaper 206 is configured to perform a shaping transformation that generates shaped data 207 having a proportion of 1's and 0's that is different from the proportion of 1's and 0's of the data bits 240. The controller 204 is configured to provide the shaped data 207 to the permutation scrambler 208. The permutation scrambler 208 is configured to generate scrambled shaped data 211 that is provided to the ECC RAM 212 for encoding by the ECC engine 210. The controller 204 is configured to send encoded scrambled shaped data 242 to the memory 220 for storage in a group of storage elements 222.

The permutation scrambler 208 is configured to generate the scrambled shaped data 211 to have a same proportion of 1's and 0's as the shaped data 207. For example, in some embodiments, a permutation scrambler may include a counter and circuitry configured to provide values P (mod Q) as described with respect to FIG. 1, an LFSR configured to generate a scrambled sequence of bit indices, a processor programmed to generate a sequence of bit indices (e.g. the indices 104 of FIG. 1) according to a P (mod Q) sequence or according to a random or pseudo-random sequence, or any other mechanism that generates the scrambled shaped data 211 having a same proportion of 1's and 0's as the shaped data 207.

In the particular embodiment illustrated in FIG. 2, the permutation scrambler 208 is configured to perform scrambling based on positions of chunks of data rather than based on positions of bits. The permutation scrambler 208 is configured to scramble the shaped data 207 using a linear feedback shift register (LFSR) 250 to scramble a sequence of addresses 262 according to a seed 260. The LFSR 250 is configured to generate a scrambled sequence of addresses 264. Data corresponding to each of the addresses of the scrambled sequence of addresses 264 may be scrambled by operation of a shifter 252, such as a cyclical shifter, to generate the scrambled shaped data 211. In an embodiment where the seed 260 is determined according to a random or pseudo-random generation technique, the seed 260 may be provided to the ECC RAM 212 with the scrambled shaped data 211. In other embodiments where the seed 260 corresponds to a parameter that may be known upon reading the data from the memory 220, such as a count of write/erase (W/E) cycles, the seed 260 may not be provided to the ECC RAM 212 for encoding and may not be stored at the memory 220. Although the seed 260 is shown as appended to the scrambled shaped data 211 to be encoded by the ECC engine 210 prior to storage at the memory 220, in other embodiments the seed 260 may be stored to the memory 220 without being encoded with the scrambled shaped data 211 by the ECC engine 210. For example, the seed 260 may be encoded using a separate, dedicated ECC engine or may be error protected via one or more other mechanisms.

The ECC engine 210 may be configured to perform error correction coding (e.g. BCH, Reed-Solomon, or Low Density Parity Check, as illustrative examples) of data to be stored to the memory 220 and error correction decoding of data read from the memory 220. The ECC engine 210 may be configured to access data stored at the ECC RAM 212 during encoding operations and during decoding operations. For example, the ECC RAM 212 may be configured to store multiple chunks of data, illustrated as a first row of chunks labeled C11, C12, C13, and C14, and a second row of chunks labeled C21, C22, C23, and C24. In a particular embodiment, the permutation scrambler 208 may be configured to fill the ECC RAM 212 according to the scrambled sequence of addresses 264 in an "on-the-fly" implementation. Bits corresponding to each of the chunks C11-C24 may be scrambled using the shifter 252 prior to storage of data in the ECC RAM 212. After storage of data to the ECC RAM 212, the ECC engine 210 may encode data in the ECC RAM 212 to generate codewords to be stored as the encoded scrambled shaped data 242.

The ECC engine 210 may be configured to write codewords including scrambled information bits and also including parity bits to the ECC RAM 212 according to an offset address 214. The offset address 214 may indicate a starting address for a codeword. To illustrate, a codeword that includes eight chunks of data including six chunks of information bits and two chunks of parity bits may be written such that the first chunk of information bits is stored at the offset address 214, (i.e. in chunk C23), the second chunk of information bits is stored in chunk C24, the third chunk of information bits is stored at chunk C11, the fourth, fifth, and sixth chunks of information bits are stored at chunks C12, C13, and C14, respectively, and the first and second chunk of parity bits are stored at C21 and C22, respectively. During a subsequent ECC encode operation, the offset address 214 may be incremented or repositioned to designate a starting address of a codeword at another location within the ECC RAM 212. As a result, (non-shaped) parity bits generated during subsequent encoding operations may be written to different locations in the ECC RAM 212 and transferred to different portions of the memory 220. When data is encoded according to a random selection of the offset address 214 and is later read from the memory 220, the controller 204 may be configured to determine the offset address 250 according to counts of the one values in portions of the encoded scrambled data read from the memory 220.

The memory 220 may be a non-volatile memory, such as a flash multi-level-cell (MLC) or a single-level-cell (SLC) memory. The memory 220 includes multiple groups of storage elements, such as the representative group of storage elements 222. For example, the representative group of storage elements 222 may be a word line (WL) of a flash memory.

Although the permutation scrambler 208 is illustrated as including the LFSR 250 to scramble chunk addresses and including the shifter 252 to scramble within each chunk, in other embodiments the permutation scrambler 208 may be configured to perform one or more other types of permutation scrambling. For example, the permutation scrambler 208 may be configured to perform permutation scrambling as described with respect to FIG. 1.

Although a single LFSR 250 is illustrated, in other embodiments the permutation scrambler may include multiple LFSRs and a particular LFSR 250 may be randomly selected for address scrambling. A permutation seed that includes an indication of the selected LFSR 250 and data to initialize the selected LFSR 250 may be appended to the scrambled data 211 to be stored in the memory 220. Alternatively, the LFSR and the data to initialize the selected LFSR may be determined via a deterministic function of the logical block address of the data to be stored, and the encoded scrambled shaped data 242 may be stored without storing a permutation seed in the memory 220. Although the permutation scrambler 208 is illustrated as including the shifter 252, in other embodiments the permutation scrambler 208 includes a second group of LFSRs. A second LFSR may be randomly selected from the second group of LFSRs and bits within each of the groups of bits corresponding to the scrambled addresses 264 may be scrambled in accordance with an output of the selected second LFSR. The permutation seed may also include an indication of the second LFSR and second data to initialize the second LFSR.

Figure 3:
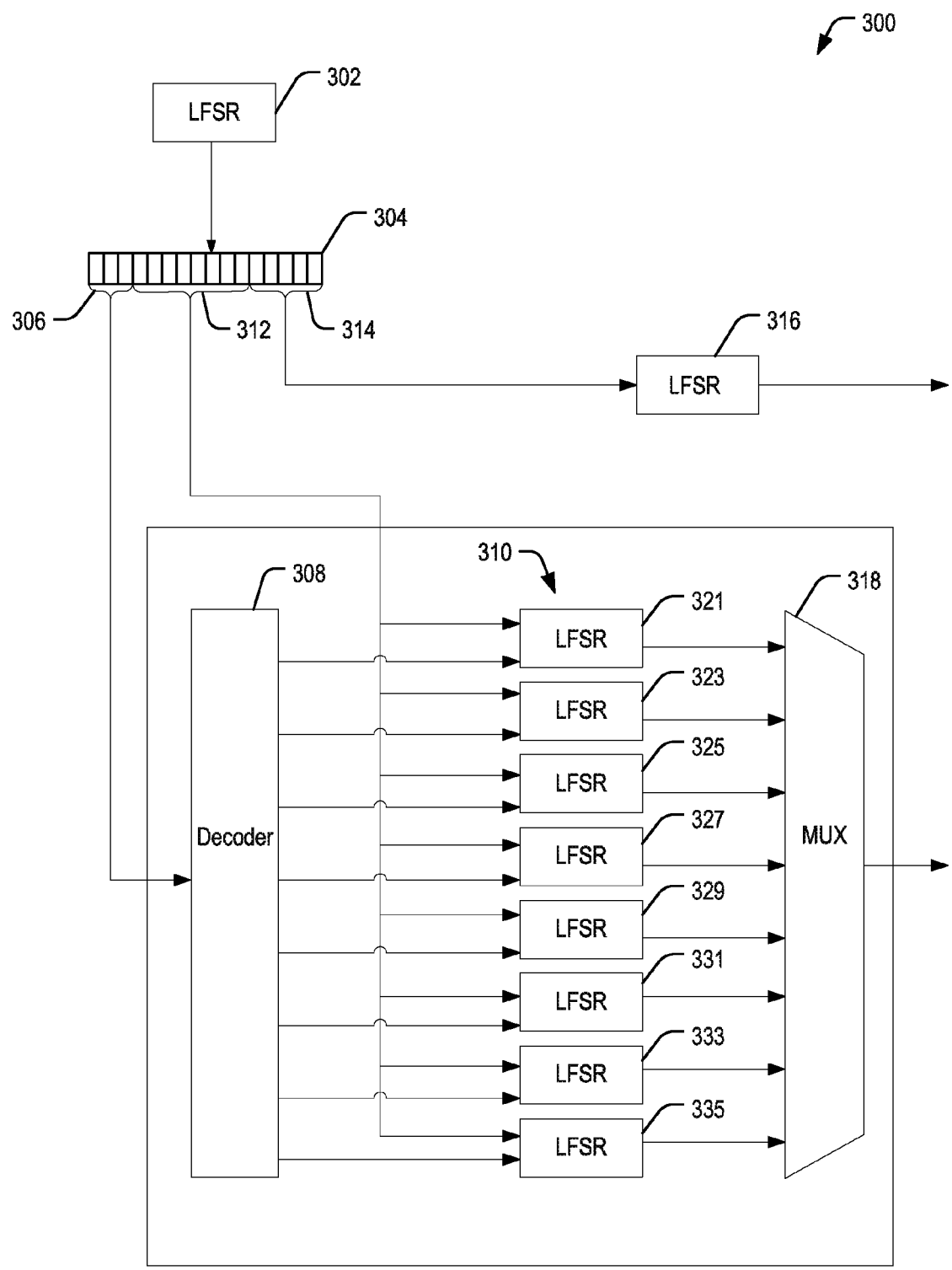
FIG. 3 is a block diagram illustrating another particular embodiment of a permutation scrambler.

FIG. 3 is a block diagram illustrating a particular embodiment of a permutation scrambler 300. For example, the permutation scrambler 300 may correspond to the permutation scrambler 208 of FIG. 2. A first linear feedback shift register (LFSR) 302 may provide a seed 304 used for permutation scrambling. For example, the LSFR 302 may be a 16-bit LSFR and the seed 304 may be a 16-bit seed that is drawn for each kilobyte of information data. A first portion 306 of the seed 304 may indicate one of a group 310 of LFSRs. For example, the first portion 306 may be three bits and the group 310 of LSFRs may include eight LSFRs 321-335. A decoder 308 may receive the first three bits 306 of the seed and may indicate a chosen or particular one of the group 310 of LFSRs.

A second portion 312 of the seed 304 may initialize the particular one of the group 310 of LFSRs. For example, the second portion 312 may be eight bits, where each of the eight bits corresponds to a respective one of the eight LSFRs 321-335 in the second group 310 of LSFRs.

A third portion 314 of the seed 304 may initialize a third LSFR 316 that produces a shift for each data chunk. For example, the third portion 314 may be five bits indicating and a shift value in a range from 0 to 31, in case the data chunks are double words.

Each of the LSFRs 321-335 in the group 310 of LSFRs may be an 8-bit LSFR configured to produce an address (0-255) for each double word of the information data, such as to cover the address space of the kilobyte of data. A scrambled sequence of addresses may be produced. For example, a second LSFR 321 may be selected from within the second group 310 of LSFRs and a group of bits corresponding to the address produced by the selected second LSFR 321 may be scrambled selected to be a next group of bits in a scrambled output. For example, each of the LSFRs 321-335 in the group 310 of LSFRs, including the selected second LSFR 321, may have a respective output that is coupled to an input of a multiplexor 318. An output of the multiplexor 318 may produce a scrambled sequence of addresses, such as the scrambled sequence of addresses 264 of FIG. 2.

Data corresponding to each of the addresses of the scrambled sequence of addresses may be scrambled by shifting the data an amount corresponding to the shift value associated with an output of the third LSFR 316, such as via the shifter 252 of FIG. 2. Although a single third LFSR 316 is illustrated, in other embodiments the third LFSR 316 may be part of a second group of LFSRs and the seed 304 may include an indicator to select a particular LFSR from the second group, such as described with respect to the first portion 306 of the seed 304 indicating a selected LFSR from the group 310.

Figure 4:
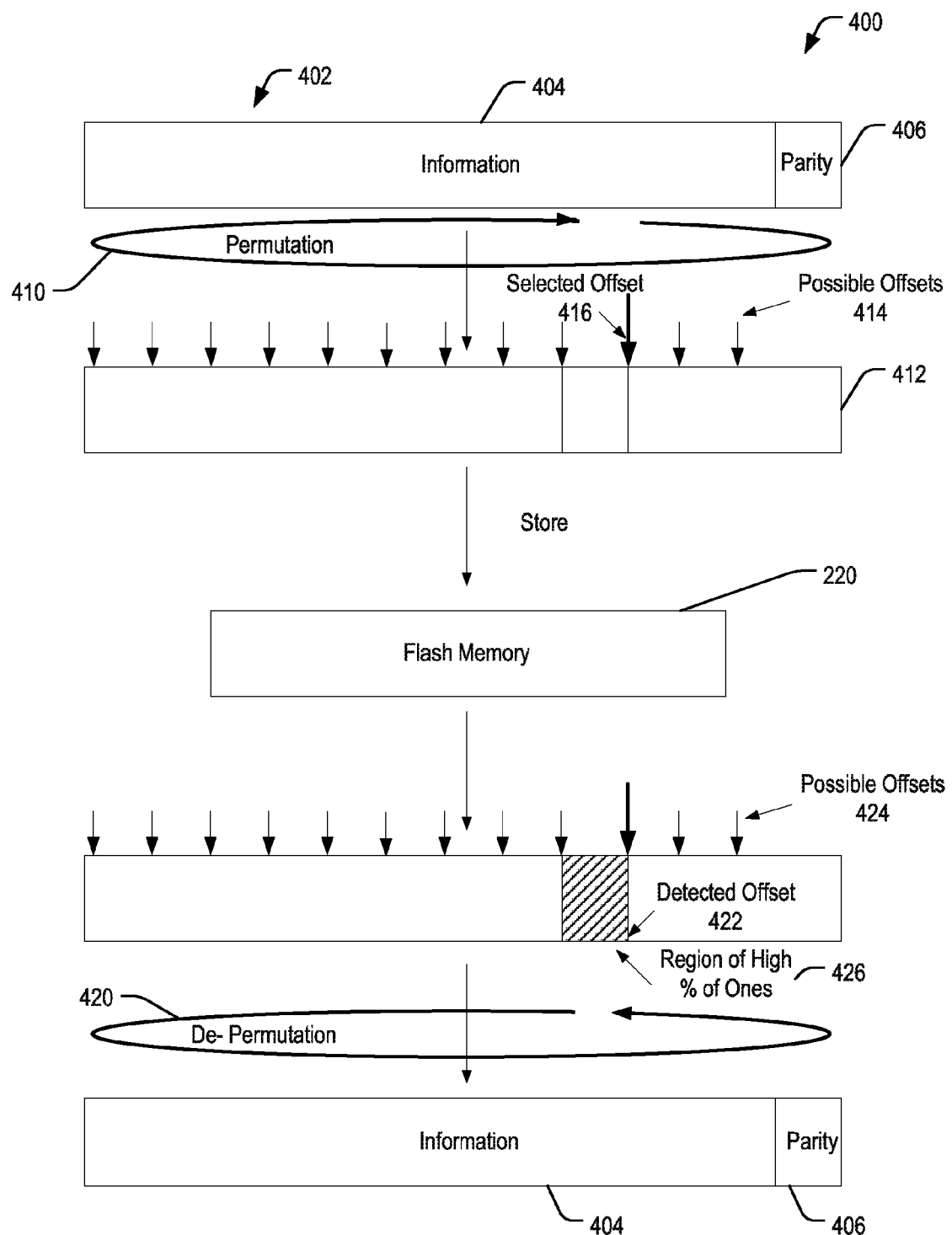
FIG. 4 is a diagrammatic representation illustrating a particular embodiment of permutation of a codeword and de-permutation of the codeword.

FIG. 4 is a diagrammatic representation illustrating a particular embodiment 400 of permutation of a codeword, such as an error correction code (ECC) codeword, and de-permutation of the codeword. In the particular embodiment illustrated in FIG. 4, a non-permuted codeword 402 (e.g., encoded shaped data) includes information bits 404 and parity bits 406. Permutation scrambling 410 may be performed on the non-permuted codeword 402. For example, the permutation scrambling 410 may be performed on chunk addresses (e.g. addresses of chunks such as bytes, words, double-words) and the permutation scrambling 410 can be performed on the bits within each of the chunks as described with respect to FIGS. 1 and 2. In addition to permutation scrambling, a location of parity bits within an error correction coding block may be changed, such as between successive encoding operations, or according to a schedule of parity shifts.

For example, changing the location of the parity bits 406 can be performed by cyclically shifting a permuted codeword 412 (i.e., the information bits 404 and the parity bits 406). Cyclically shifting the permuted codeword 412 may be performed by outputting the permuted codeword 412 to a memory, such as the flash memory 220 of FIG. 2, starting from a selected offset address 416. For example, a plurality of possible offset addresses 414 may be available. The selected offset addresses 416 can be selected from the plurality of possible offset addresses 414 as a function of a parameter that changes value with each program operation of a block of the flash memory 220 into which the permuted codeword 412 is to be programmed, such as a count of write/erase cycles. Alternatively, the selected offset address 416 can be chosen randomly and stored at some other location of the memory, such as being stored in one or more flash management tables. Alternatively, the selected offset address 416 can be chosen randomly out of a predefined set of offset addresses (i.e. from the plurality of possible offset addresses 414). After one of the plurality of possible offset addresses 414 has been selected as the selected offset address 416, the permuted codeword 412 may be shifted in correspondence with the selected offset address 416 and output to the flash memory 220.

During reading of the permuted codeword 412 from the flash memory 220, a corresponding descrambling operation or de-permutation scrambling 420 may be performed. For example, a detected offset address 422 may be detected from a second plurality of possible offset addresses 424 by identifying a region 426 with a relatively high percentage of 1's (e.g. approximately 50%). The region 426 with a high percentage of 1's may be detected by counting the number of 1's within multiple windows (each window corresponding to a different offset address of the plurality of possible offset addresses 424), where the window size may be equal to the number of parity bits. The offset address corresponding to a start of the parity may be determined by identifying the window corresponding to the highest count of 1's. Once the start of the parity is determined, the information bits 404 and the parity bits 406 may be recovered.

By varying the selected offset address 416 as other data is stored to the flash memory 220, uneven wearing of cells storing the parity 406 as compared to the information 404 (due to a higher concentration of 1's in the parity 406) may be balanced in the flash memory 220. As a result, a useful life of the flash memory 220 may be enhanced as compared to systems where parity bits are repeatedly stored to a same location, such as a same set of flash memory cells in a SLC cache.

Figure 5:
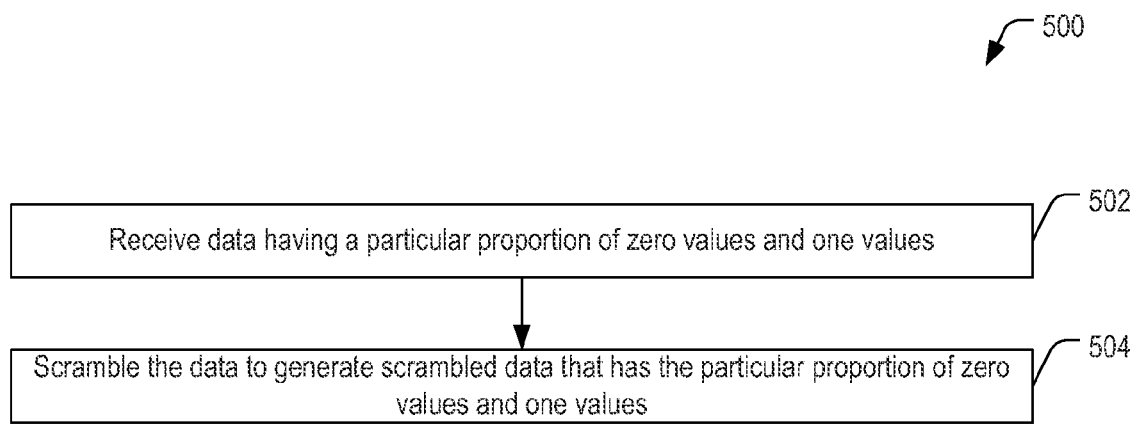
FIG. 5 is a flow chart illustrating a particular embodiment of a method of permutation scrambling.

FIG. 5 illustrates a particular embodiment of a method of permutation scrambling. The method 500 includes receiving data having a particular proportion of zero values and one values, at 502. The data is scrambled to generate scrambled data that has the particular proportion of zero values and one values, at 504.

For example, the data may correspond to the original sequence 102 of FIG. 1 and may have a length Q. Scrambling the data may include copying bits at non-sequential bit positions in the data (e.g. non-sequential bit positions in the original sequence 102) to sequential bit positions in the scrambled data (e.g. sequential bit positions in the scrambled sequence 106). A distance P between the non-sequential bit positions may be prime to Q. Each bit position k in the scrambled data may have a same bit value as a bit position $(k-1)P \pmod{Q}$ in the received data.

As another example, scrambling the data may include copying a first group of bits from a first group position in the first data to a second group position in the second data, where the first group position is different from the second group position, such as described with respect to FIG. 2. Scrambling the data may also include copying a second group of bits from the data to the scrambled data, where the first group of bits and the second group of bits are copied from non-sequential group positions in the data to sequential group positions in the scrambled data. To illustrate, the LFSR 262 of FIG. 2 may re-order addresses of groups of bits in the shaped data 207 when forming scrambled data that is written to the ECC RAM 212 so that non-sequential groups of bits in the shaped data 207 are copied to sequential portions of the ECC RAM 212. For example, two non-sequential groups (chunks) of bits in the shaped data may be copied to the ECC RAM 212 as the sequential chunks C11 and C12. Scrambling the data may further include shifting bits within the first group of bits, such as via the shifter 252 of FIG. 2.

The method 500 may be performed in a data storage device that has a controller and a memory coupled to the controller, such as the controller 204 and the memory 220 of the data storage device 202 of FIG. 2. The controller includes a scrambler configured to receive data having a particular proportion of zero values and one values and to scramble the data to generate scrambled data that has the particular proportion of zero values and one values. As an example, the data may have a length Q, the scrambler may be configured to copy bits at non-sequential bit positions in the data to sequential bit positions in the scrambled data, a distance P between the non-sequential bit positions may be prime to Q, and each bit position k in the scrambled data may have a same bit value as a bit position (k−1)P (mod Q) in the data. As another example, the scrambler may be configured to copy a first group of bits from a first group position in the first data to a second group position in the second data, where the first group position is different from the second group position.

Although various components depicted herein are illustrated as block components and described in general terms, such components may include one or more microprocessors, state machines, or other circuits configured to enable the data storage device 202 of FIG. 2 to perform the particular functions attributed to such components. For example, the permutation scrambler 208 of FIG. 2 may represent physical components, such as hardware controllers, state machines, logic circuits, or other structures, to enable the permutation scrambler 208 to scramble shaped data to generate scrambled shaped data that has a same proportion of 1's and 0's as the shaped data. For example, the permutation scrambler 208 may include a LFSR and/or a shifter (e.g. a cyclic shifter/barrel shifter) to perform address permutation and chunk permutation, respectively.

Alternatively, one of more aspects of the functionality of the permutation scrambler 208 may be implemented using a microprocessor or microcontroller programmed to perform the respective functionality. In a particular embodiment, the memory 220 includes executable instructions that are executed by a processor in the controller 204. Alternatively, or in addition, executable instructions that are executed by a processor in the controller 204 may be stored at a separate memory location that is not part of the memory 220, such as at a RAM or at a read-only memory (ROM).

In a particular embodiment, the data storage device 202 may be a portable device configured to be selectively coupled to one or more external devices. For example, the data storage device 202 may be a universal serial bus (USB) flash device or a removable memory card, as illustrative examples. However, in other embodiments, the data storage device 202 may be attached or embedded within one or more host devices, such as within a housing of a portable communication device. For example, the data storage device 202 may be within a packaged apparatus such as a wireless telephone, a personal digital assistant (PDA), a gaming device or console, a portable navigation device, a computer device, or other device that uses internal non-volatile memory. In a particular embodiment, the data storage device 202 includes a non-volatile memory, such as a flash memory (e.g., NAND, NOR, Multi-Level Cell (MLC), Divided bit-line NOR (DINOR), AND, high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Accordingly, the disclosure and the figures are to be regarded as illustrative rather than restrictive.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    in a data storage device including multiple linear feedback shift registers (LFSRs), performing:
        receiving data having a particular proportion of zero values and one values; and
        scrambling the data to generate scrambled data that has the particular proportion of zero values and one values, wherein scrambling the data includes re-ordering addresses of groups of bits in the data according to an output of a LFSR, and wherein the LFSR is selected from the multiple LFSRs.

2. The method of claim 1, wherein for any received data, the scrambled data has the same proportion of zero values and one values as the received data.

3. The method of claim 1, wherein the data has a length Q and wherein scrambling the data includes copying bits at non-sequential bit positions in the data to sequential bit positions in the scrambled data, wherein a distance P between the non-sequential bit positions is prime to Q, and wherein each bit position k in the scrambled data has a same bit value as a bit position (k−1)P(mod Q) in the data.

4. The method of claim/claim 1, wherein the data has a length Q, wherein scrambling the data includes copying bits at non-sequential bit positions in the data to sequential bit positions in the scrambled data, wherein a distance P between the non-sequential bit positions is prime to Q, and further comprising selecting a particular value of the distance P and selecting a starting bit position in the data.

5. The method of claim 1, wherein scrambling the data includes copying a first group of bits from a first group position in the data to a second group position in the scrambled data, wherein the first group position is different from the second group position.

6. The method of claim 5, wherein scrambling the data includes copying a second group of bits from the data to the scrambled data, wherein the first group of bits and the second group of bits are copied from non-sequential group positions in the data to sequential group positions in the scrambled data.

7. The method of claim 5, wherein scrambling the data further includes shifting bits within the first group of bits.

8. The method of claim 1, wherein the LFSR operates according to a seed, and further comprising appending the seed to the scrambled data to be stored in a memory of the data storage device.

9. The method of claim 1, wherein a permutation seed that includes an indication of the selected LFSR and data to initialize the selected LFSR is appended to the scrambled data to be stored in a memory of the data storage device.

10. The method of claim 9, wherein scrambling the data further includes selecting a second LFSR from a second group of LFSRs and scrambling bits within each of the groups of bits in accordance with an output of the second LFSR, and wherein the permutation seed further includes an indication of the second LFSR and second data to initialize the second LFSR.

11. A method comprising:
    in a data storage device, performing:
        receiving data having a particular proportion of zero values and one values;
        scrambling the data to generate scrambled data that has the particular proportion of zero values and one values;

performing an error correction coding of the scrambled data to generate encoded scrambled data having an offset address; and storing the encoded scrambled data in a memory associated with the data storage device such that a physical location of the encoded scrambled data within the memory is a function of the offset address.

12. The method of claim 11, further comprising determining the offset address according to counts of the one values in portions of the encoded scrambled data read from the memory.

13. The method of claim 11, wherein the offset address is a function of a parameter that changes from one programming cycle to another, wherein the parameter is a parameter of a block of the memory.

14. The method of claim 13, wherein the parameter comprises a write/erase cycle count.

15. The method of claim 11, wherein the offset address is stored in a management table of the memory.

16. The method of claim 11, wherein the offset address is chosen randomly from a predetermined set of offset addresses.

17. The method of claim 11, wherein the data is scrambled in a controller associated with the data storage device.

18. The method of claim 11, wherein the memory is a flash memory.

19. The method of claim 11, wherein the data is shaped data generated in a controller associated with the data storage device based on user data received from a host device while the data storage device is operatively coupled to the host device.

20. The method of claim 19, wherein the data storage device includes the controller and the memory.

21. A data storage device comprising:
a memory; and
a controller coupled to the memory, wherein the controller includes a scrambler configured to receive data having a particular proportion of zero values and one values and to scramble the data to generate scrambled data that has the particular proportion of zero values and one values, wherein the scrambler includes multiple linear feedback shift registers (LFSRs), and wherein the scrambler is configured to re-order addresses of groups of bits in the data according to an output of a LFSR selected from the multiple LFSRs.

22. The data storage device of claim 21, wherein the data has a length Q and wherein scrambling the data includes copying bits at non-sequential bit positions in the data to sequential bit positions in the scrambled data, wherein a distance P between the non-sequential bit positions is prime to Q, and wherein each bit position k in the scrambled data has a same bit value as a bit position $(k-1)P(\mod Q)$ in the data.

23. The data storage device of claim 21, wherein the scrambler is configured to copy a first group of bits from a first group position in the data to a second group position in the scrambled data, wherein the first group position is different from the second group position.

24. The data storage device of claim 23, wherein the scrambler is configured to copy a second group of bits from the data to the scrambled data, wherein the first group of bits and the second group of bits are copied from non-sequential group positions in the data to sequential group positions in the scrambled data.

25. The data storage device of claim 23, wherein scrambler includes a shifter configured to shift bits within the first group of bits.

26. The data storage device of claim 21, wherein the LFSR operates according to a seed, and wherein the seed is appended to the scrambled data to be stored in the memory.

27. A data storage device comprising:
a memory; and
a controller coupled to the memory, wherein the controller includes:
a scrambler configured to scramble data having a particular proportion of zero values and one values to generate scrambled data that has the particular proportion of zero values and one values; and
an error correction coding (ECC) engine configured to perform an error correction coding of the scrambled data to generate encoded scrambled data having an offset address, and
wherein the controller is configured to store the encoded scrambled data in the flash memory such that a physical location of the encoded scrambled data within the memory is a function of the offset address.

28. The data storage device of claim 27, wherein the controller is configured to determine the offset address according to counts of the one values in portions of the encoded scrambled data read from the flash memory.

29. The data storage device of claim 28, wherein, in response to an ECC decode failing of the encoded scrambled data read from the memory using the offset address, the controller is configured to initiate ECC decoding of the encoded scrambled data using another offset address.

30. The data storage device of claim 29, wherein the controller is configured to select offset addresses according to an ordering of counts of the zero values in the portions of the encoded scrambled data read from the memory.

31. The data storage device of claim 29, wherein the controller is configured to initiate ECC decoding of the encoded scrambled data using the other offset address by comparing a syndrome weight to a threshold.

32. The data storage device of claim 28, wherein the controller is configured to use a default offset address in response to determining that the particular proportion of zero values and one values is above a shaping threshold.

33. The data storage device of claim 27, wherein the controller is configured to determine the offset address according to a function of a parameter that changes from one programming cycle to another, wherein the parameter is a parameter of a block of the flash memory.

34. The data storage device of claim 33, wherein the parameter comprises a write/erase cycle count.

35. The data storage device of claim 27, wherein the offset address is stored in a management table of the memory.

36. The data storage device of claim 27, wherein the controller is configured to determine the offset address according to counts of the zero values in portions of the encoded scrambled data read from the memory.

37. The data storage device of claim 36, wherein the controller is configured to determine the offset address corresponding to the portion having the highest density of the zero values and wherein the controller is configured to use a default offset address in response to determining that the particular proportion of zero values and one values is above a shaping threshold or in response to determining that a difference between the highest density of the zero values of the portions and a next-highest density of the zero values of the portions is smaller than a threshold.

38. The data storage device of claim 27, wherein the scrambler is further configured to receive the data having a particular proportion of zero values and one values.

39. The data storage device of claim 27, wherein the controller further comprises a shaper configured to generate the data by shaping user data received from a host device while the data storage device is operatively coupled to the host device.

40. The data storage device of claim 39, wherein the memory is a flash memory.

\* \* \* \* \*